United States Patent
Park et al.

(10) Patent No.: US 12,334,606 B2
(45) Date of Patent: Jun. 17, 2025

(54) CONDENSATE WATER DRAIN CONTROL SYSTEM AND CONTROL METHOD FOR FUEL CELL

(71) Applicants: Hyundai Motor Company, Seoul (KR); Kia Motors Corporation, Seoul (KR)

(72) Inventors: Gun Hyung Park, Seongnam-si (KR); Kyu Il Lee, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1045 days.

(21) Appl. No.: 16/368,078

(22) Filed: Mar. 28, 2019

(65) Prior Publication Data
US 2020/0136158 A1    Apr. 30, 2020

(30) Foreign Application Priority Data

Oct. 24, 2018    (KR) ........................ 10-2018-0127413

(51) Int. Cl.
*H01M 8/04119* (2016.01)
*H01M 8/0438* (2016.01)
(Continued)

(52) U.S. Cl.
CPC ... *H01M 8/04156* (2013.01); *H01M 8/04432* (2013.01); *H01M 8/04492* (2013.01); *H01M 8/04828* (2013.01)

(58) Field of Classification Search
CPC ......... H01M 8/04852; H01M 8/04589; H01M 8/04291; H01M 8/04231; H01M 8/04156; H01M 8/04164
See application file for complete search history.

(56) References Cited

U.S. PATENT DOCUMENTS

2014/0212780 A1*   7/2014   Furusawa ......... H01M 8/04388
                                                                429/429
2016/0087289 A1    3/2016   Shim et al.

FOREIGN PATENT DOCUMENTS

CN         101228656 A      7/2008
CN         105720281 A      6/2016
(Continued)

OTHER PUBLICATIONS

Office Action issued on Feb. 23, 2024 in Chinese Patent Application No. 201910324176.5 with English translation.
(Continued)

*Primary Examiner* — Stephan J Essex
(74) *Attorney, Agent, or Firm* — Morgan, Lewis & Bockius LLP

(57) ABSTRACT

A condensate water drain control system for a fuel cell includes; a fuel cell stack configured to generate electric power through a chemical reaction of fuel, a fuel supply line configured to recirculate fuel drained from the fuel cell stack or supply fuel supplied from a fuel tank to the fuel cell stack, a water trap provided at the fuel supply line and configured to store condensate water generated in the fuel cell stack, a drain valve provided at an outlet of the water trap and configured to be opened or closed to allow or block drainage of the condensate water stored in the water trap, and a controller configured to control the drain valve to be closed on the basis of a state of supplying fuel to the fuel cell stack through the fuel supply line in a state of the drain valve is opened.

8 Claims, 2 Drawing Sheets

(51) Int. Cl.
*H01M 8/04492* (2016.01)
*H01M 8/04828* (2016.01)

(56) References Cited

FOREIGN PATENT DOCUMENTS

| | | | |
|---|---|---|---|
| CN | 107275660 A | 10/2017 | |
| CN | 108172875 A | 6/2018 | |
| DE | 102011119307 A1 * | 5/2013 | ........ H01M 8/04291 |
| JP | 2004-039526 A | 2/2004 | |
| KR | 10-2010-0008496 A | 1/2010 | |
| KR | 10-2010-0058867 A | 6/2010 | |
| KR | 2010058867 A * | 6/2010 | |
| KR | 10-0969063 B1 | 7/2010 | |
| KR | 10-2012-0064204 A | 6/2012 | |
| KR | 10-2013-0037694 A | 4/2013 | |
| KR | 10-2014-0078490 A | 6/2014 | |
| KR | 10-2015-0072238 A | 6/2015 | |
| KR | 2015073661 A * | 7/2015 | |
| KR | 10-2015-0111502 A | 10/2015 | |
| WO | WO-2005091397 A2 * | 9/2005 | ........ H01M 8/04164 |

OTHER PUBLICATIONS

Office Action issued on Dec. 19, 2023 in corresponding Korean patent application No. 10-2018-0127413.

Ma et al., Gas and Water Management System in a 5 kW PEM Fuel Cell Stack, Laboratory of Energy and Environment in Mechanical Engineering, National Taiwan University, Taipei 10617, China, 1994-2023 China Academic Journal Electronic Publishing House, http://www.cnki.net, Aug. 21, 2012.

Notice of Allowance issued on Nov. 9, 2024 in corresponding Chinese patent application No. 201910324176.5 with English translation.

* cited by examiner

CONDENSATE WATER DRAIN CONTROL SYSTEM AND CONTROL METHOD FOR FUEL CELL

CROSS REFERENCE TO RELATED APPLICATION

The present application claims the benefit of priority to Korean Patent Application No. 10-2018-0127413 filed on Oct. 24, 2018, the entire contents of which is incorporated herein for all purposes by this reference.

TECHNICAL FIELD

The present disclosure relates to a condensate water drain control system and a condensate water drain control method for a fuel cell, and more particularly, to a control technique for draining condensate water stored in a water trap even when a water level sensor of the water trap fails.

BACKGROUND

A fuel cell is a kind of power generation device which converts chemical energy generated due to oxidation of fuel directly into electric energy. Similar to a chemical cell in terms of basically using an oxidation-reduction reaction, but unlike the chemical cell which performs a cell reaction inside a closed system, the fuel cell is different from the chemical cell in that a reactant is continuously supplied from the outside of a system and a reaction product is continuously removed to the outside thereof. Recently, a fuel cell power generation system has been put into practical use, and since a reaction product of the fuel cell is pure water, research for using the fuel cell power generation system as an energy source of an eco-friendly vehicle have been actively carried out.

A fuel cell system includes a fuel cell stack for generating electrical energy through a chemical reaction, an air supply device for supplying air to a cathode of the fuel cell stack, and a hydrogen supply device for supplying hydrogen to a anode of the fuel cell stack.

When the fuel cell stack generates electric power, water is generated in the fuel cell stack and some of the water is discharged to the anode by passing through an electrolyte membrane due to a concentration difference. The hydrogen supply device recirculates hydrogen gas through a recirculation device and the water drained from the anode is condensed and stored in a water trap which is included in the hydrogen supply device.

The water trap includes a water level sensor, and when a water level of the condensate water detected by the water level sensor is equal to or higher than a predetermined drain level, the water trap opens a drain valve to drain the stored condensate water. Further, when the water level of the condensate water detected by the water level sensor is equal to or lower than a predetermined blocking level, the water trap blocks the drain valve to prevent a leakage of hydrogen.

However, when the water level sensor of the water trap fails, the water level of the condensate water stored in the water trap cannot be measured such that there is a problem in that the drain valve cannot be appropriately controlled. When the condensate water of the hydrogen supply device cannot be smoothly drained out, the water cannot be drained from the fuel cell stack to the outside such that a flow path of a separator is blocked, whereas when the drain valve is opened more than necessary, hydrogen is unnecessarily drained out such that fuel efficiency is degraded.

Conventionally, in order to prevent such problems, when the water level sensor of the water trap fails, fail-safe control is used to open the drain valve when a current integrated value reaches a predetermined constant value on the basis of the current integrated value obtained by integrating a current generated from the fuel cell stack, but an amount of the condensate water stored in the water trap is not constant according to a state of the fuel cell stack such that there is a problem in that the level of the water trap cannot be accurately measured.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a technique for appropriately controlling a drain valve by detecting condensate water stored in a water trap even when a level sensor of the water trap fails.

According to one aspect, a condensate water drain control system for a fuel cell includes a fuel cell stack configured to generate electric power through a chemical reaction of fuel, a fuel supply line configured to recirculate fuel drained from the fuel cell stack or supply fuel supplied from a fuel tank to the fuel cell stack, a water trap provided at the fuel supply line and configured to store condensate water generated in the fuel cell stack, a drain valve provided at an outlet of the water trap and configured to be opened or closed to allow or block drainage of the condensate water stored in the water trap, and a controller configured to estimate a chemical reaction amount of the fuel, open the drain valve on the basis of the estimated chemical reaction amount, and control the drain valve to be closed on the basis of a state of supplying fuel to the fuel cell stack through the fuel supply line in a state of the drain valve is opened.

The condensate water drain control system may further include a pressure sensor configured to measure a pressure at an anode side of the fuel cell stack, wherein the controller may control the drain valve to be closed according to the pressure at the anode side measured by the pressure sensor.

The condensate water drain control system may further include a fuel supply valve disposed between the fuel tank and the fuel supply line and configured to control the fuel supplied from the fuel tank to the fuel supply line, wherein the controller may control the drain valve to be closed according to an opening degree of the fuel supply valve.

The condensate water drain control system may further include a purge valve provided at the fuel supply line and configured to control a purge for draining a gas of the fuel supply line to an outside, wherein the controller may estimate a fuel drainage amount drained to an outlet of the water trap by the opening of the drain valve and control the purge valve to be opened on the basis of an estimated gas amount drained to the outlet of the water trap.

According to another aspect, a condensate water drain control method for a fuel cell includes estimating a reaction amount of fuel in a fuel cell stack, controlling a drain valve to be opened, wherein the drain valve allows or blocks drainage of condensate water stored in a water trap for storing the condensate water of a fuel supply line on the basis of the estimated reaction amount, and controlling the drain valve to be closed on the basis of a state of supplying fuel to the fuel cell stack through the fuel supply line in a state in which the drain valve is opened.

The estimating of the reaction amount of the fuel in the fuel cell stack may include estimating the reaction amount of the fuel in the fuel cell stack on the basis of a current integrated value obtained by integrating an output current of the fuel cell stack with a passage of time.

In the controlling of the drain valve to be opened, the drain valve is opened, where the estimated reaction amount is equal to or greater than a predetermined reaction amount.

In the controlling of the drain valve to be closed, the drain valve is closed, where a pressure at an anode side of the fuel cell stack, which is measured by a pressure sensor, is decreased at a predetermined reduction rate or more.

The measured pressure of the anode side of the fuel cell stack may be equal to or greater than a target pressure set according to a required power generation amount of the fuel cell.

In the controlling of the drain valve to be closed, the drain valve is closed, where a value obtained by subtracting the pressure of the anode side of the fuel cell stack, which is measured by the pressure sensor, from the target pressure set according to the required power generation amount of the fuel cell is equal to or greater than a predetermined pressure difference.

In the controlling of the drain valve to be closed, the drain valve is closed, where a predetermined opening time is elapsed from a point of time at which the drain valve is controlled to be opened, and a criterion of the reaction amount for controlling the drain valve to be opened is reduced, where the predetermined opening time is elapsed and an opening degree of the fuel supply valve in a fuel tank is equal to or less than a predetermined threshold opening degree with the elapse of a predetermined opening time.

The target pressure set according to the required power generation amount of the fuel cell may be fixed for the predetermined opening time elapsed from the point of time at which the drain valve is controlled to be opened.

The condensate water drain control method may further include, after the controlling of the drain valve to be closed, estimating a fuel drainage amount drained through an outlet of the water trap, and controlling of a purge valve to be opened, wherein the purge valve may control purge for draining a gas of the fuel supply line to an outside on the basis of the estimated fuel drainage amount.

The controlling of the drain valve to be closed may include estimating the fuel drainage amount on the basis of a difference between the pressure at the anode side of the fuel cell stack and an external pressure.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
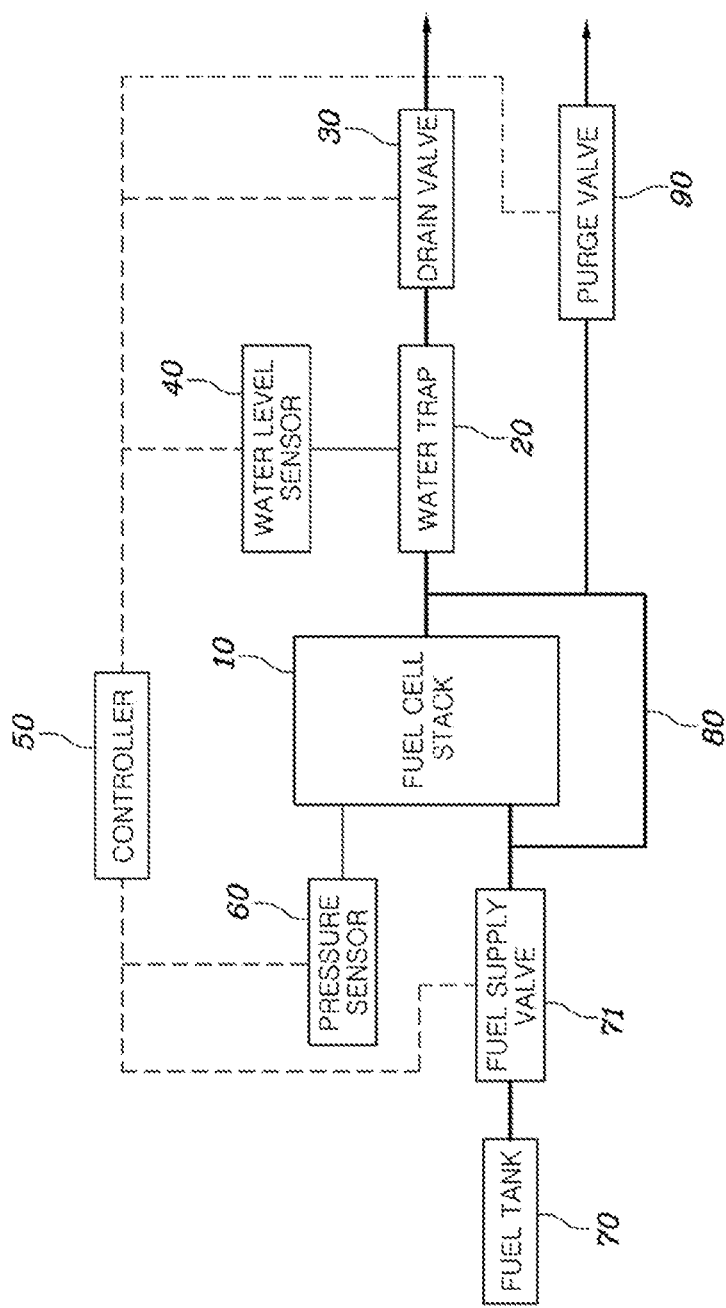
FIG. 1 is a block diagram of a condensate water drain control system for a fuel cell according to one embodiment of the present disclosure.

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. Contrarily, when a component is referred to as being "directly connected" or "directly coupled" to another component, it should be understood that yet another component may be absent between the component and another component. Other expressions describing the relationship between components, that is, "between" and "immediately between," or "adjacent to" and "directly adjacent to" should also be construed as described above.

Terms used herein is used only for the purpose of describing specific embodiments, and are not intended to limit the present disclosure. Unless the context clearly dictates otherwise, the singular form includes the plural faint. In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skill in the art to which the present disclosure pertains. General terms that are defined in a dictionary shall be construed to have meanings that are consistent in the context of the relevant art, and will not be interpreted as having an idealistic or excessively formalistic meaning unless clearly defined in this disclosure.

Hereinafter, preferred embodiments of the present disclosure will be described in detail with reference to the accompanying drawings. Like reference numerals denote like members throughout the drawings.

FIG. 1 is a block diagram of a condensate water drain control system for a fuel cell according to one embodiment of the present disclosure.

Referring to FIG. 1, a condensate water drain control system for a fuel cell according to one embodiment of the present disclosure includes a fuel cell stack 10 for generating electric power through a chemical reaction of fuel, a fuel supply line 80 for recirculating the fuel drained from the fuel cell stack 10 or supplying the fuel supplied from a fuel tank 70 to the fuel cell stack 10, a water trap 20 provided at the fuel supply line 80 and configured to store condensate water generated in the fuel cell stack 10, a drain valve 30 provided at an outlet of the water trap 20 and configured to be opened or closed to allow or block drainage of the condensate water stored in the water trap 20, a controller 50 for estimating a chemical reaction amount of the fuel, opening the drain valve 30 on the basis of the estimated chemical reaction amount, and controlling the drain valve 30 to be closed on the basis of a state of a fuel supply to the fuel cell stack 10 through the fuel supply line 80 in a state in which the drain valve 30 is opened.

The fuel cell stack 10 generates electric power through a chemical reaction by receiving hydrogen and oxygen, which are fuel, from a hydrogen electrode (anode) and an oxygen electrode (cathode). The hydrogen and the oxygen react inside the fuel cell stack 10 to generate condensate water.

The fuel supply line 80 supplies the fuel supplied from the fuel tank 70 to the fuel cell stack 10, recirculates the fuel drained from the fuel cell stack 10, and supplies the recirculated fuel to the fuel cell stack 10 again. That is, the fuel supply line 80 recirculates the fuel drained from the fuel cell stack 10 and mixes the drained fuel with fuel supplied from the fuel tank 70 to supply the mixed fuel to the fuel cell stack 10 again.

The fuel tank 70 stores high-pressure hydrogen and supplies the stored high-pressure hydrogen to the fuel supply line 80. The high-pressure hydrogen stored in the fuel tank 70 undergoes a pressure reduction process to be supplied to the fuel supply line 80.

The water trap 20 is provided at the fuel supply line 80 to store the condensate water generated in the fuel cell stack 10. Specifically, the water trap 20 stores the condensate water which is generated at the cathode of the fuel cell stack 10 and is diffused to the anode to move to the fuel supply line 80. An outlet of the water trap 20 may be connected to the outside or to a humidifier disposed at an inlet of the cathode of the fuel cell stack 10.

The drain valve 30 may be provided at the outlet of the water trap 20 to control the drainage of the condensate water of the water trap 20. Specifically, the drain valve 30 may be opened to allow the drainage of the condensate water stored in the water trap 20 and may be closed to block the drainage of the condensate water. Generally, the drain valve 30 is controlled to be in a closed state so as to prevent hydrogen from being drained through the outlet of the water trap 20, and when the condensate water is stored, the drain valve 30 is intermittently opened to drain the condensate water to the outside.

Generally, a water level sensor 40 may be provided at the water trap 20 to detect the condensate water stored in the water trap 20. Specifically, the water level sensor 40 may detect an amount of the stored condensate water by sensing a water level of the condensate water stored in the water trap 20, and opening or closing of the drain valve 30 may be controlled on the basis of the sensed water level of the water level sensor 40.

Specifically, when the condensate water is determined as being stored at a first water level or higher on the basis of the sensed water level of the water level sensor 40, the drain valve 30 may be opened, and when the condensate water is determined as being stored at a second water level or lower on the basis of the sensed water level of the water level sensor 40, the drain valve 30 may be closed. However, when the water level sensor 40 fails, the opening or closing of the drain valve 30 cannot be controlled on the basis of the sensed water level of the water level sensor 40.

Therefore, the controller 50 may estimate a chemical reaction amount of fuel, open the drain valve 30 on the basis of the estimated chemical reaction amount, and control the drain valve 30 to be closed on the basis of a state of a fuel supply to the fuel cell stack 10 through the fuel supply line 80.

The controller 50 may be a separately formed controller or a separate controller for controlling a hydrogen supply system of a fuel cell, or the controller 50 may be included in a fuel cell controller (fuel cell control unit (FCU)) to control the hydrogen supply system of the fuel cell.

The controller 50 may include at least one memory and at least one processor programmed to perform various functions described hereinafter.

As described below, the state of the fuel supply to the fuel cell stack 10 may be determined using a pressure measured at an anode side of the fuel cell stack 10 and a pressure of a fuel supply valve 71 controlling fuel supplied from the fuel tank 70 to the fuel supply line 80.

Accordingly, even when the water level sensor 40 fails or the water level sensor 40 is not included, the drain valve 30 may be controlled to appropriately drain the condensate water stored in the water trap 20 such that there is an effect of being capable of preventing occurrence of flooding at the fuel cell stack 10 due to the excessive condensate water stored in the water trap 20 and preventing drainage of the hydrogen of the fuel supply line 80 through the drain valve 30.

A pressure sensor 60 for measuring a pressure at the anode side of the fuel cell stack 10 is further included, and the controller 50 may control the drain valve 30 to be closed according to the pressure at the anode side measured by the pressure sensor 60.

The pressure sensor 60 may measure the pressure at the anode side of the fuel cell stack 10. As described below, the controller 50 may control closing of the drain valve 30 using the pressure at the anode side of the fuel cell stack 10, which is measured by the pressure sensor 60.

As another embodiment, the pressure sensor 60 may be provided at the fuel supply line 80 to measure a pressure of the fuel supply line 80. Specifically, the pressure sensor 60 may be disposed at a position of the fuel supply line 80 connected to an inlet side of the anode of the fuel cell stack 10 to measure the pressure of the fuel supply line 80 flowing into the anode of the fuel cell stack 10.

The fuel supply valve 71 disposed between the fuel tank 70 and the fuel supply line 80 and configured to control fuel supplied from the fuel tank 70 to the fuel supply line 80 is further included, and the controller 50 may control the valve 30 to be closed according to an opening degree of the fuel supply valve 71.

The fuel supply valve 71 may be located between the fuel tank 70 and the fuel supply line 80. The opening degree of the fuel supply valve 71 may be controlled according to the pressure of the fuel supply line 80 or according to the pressure at the anode side measured by the pressure sensor 60 and a target pressure according to a required power generation amount of the fuel cell. That is, the opening degree of the fuel supply valve 71 may be controlled to direct the pressure at the anode side measured by the pressure sensor 60 to converge on the target pressure according to the required power generation amount of the fuel cell.

In separation from the fuel supply valve 71, a shut-off valve (not shown) configured to be controlled to be opened or closed according to turning a starting of a fuel cell system on or off to supply or block hydrogen may be further included, and the fuel supply valve 71 may be formed as an integrated type valve to further perform a function of the shut-off valve (not shown).

The controller 50 may detect drainage of fuel of the fuel supply line 80 according to the opening degree of the fuel supply valve 71 to control the closing of the drain valve 30.

A purge valve 90 provided at the fuel supply line 80 and configured to control a purge for draining a gas of the fuel supply line (80) to the outside is further included, and the controller 50 may estimate a fuel drainage amount drained to the outlet of the water trap 20 according to the opening of the drain valve 30 and control opening of the purge valve 90 on the basis of an estimated gas amount drained to the outlet of the estimated water trap 20.

The purge valve 90 is disposed at the fuel supply line 80, through which the fuel is recirculated again by passing through the fuel cell stack 10, and is capable of draining a gas, of which a hydrogen concentration is lowered in the fuel supply line 80 as the gas passes through the fuel cell stack 10, to the outside.

The controller 50 may estimate the fuel drainage amount drained through the outlet of water trap 20 and reduce an opening time of the purge valve 90 or increase an opening period of the purge valve 90 by reflecting the estimated fuel drainage amount. That is, when the fuel is drained through the outlet of the water trap 20, the controller 50 may control the purge valve 90 to reduce a purge amount.

A control method of the controller 50 will be described in detail below.

Figure 2:
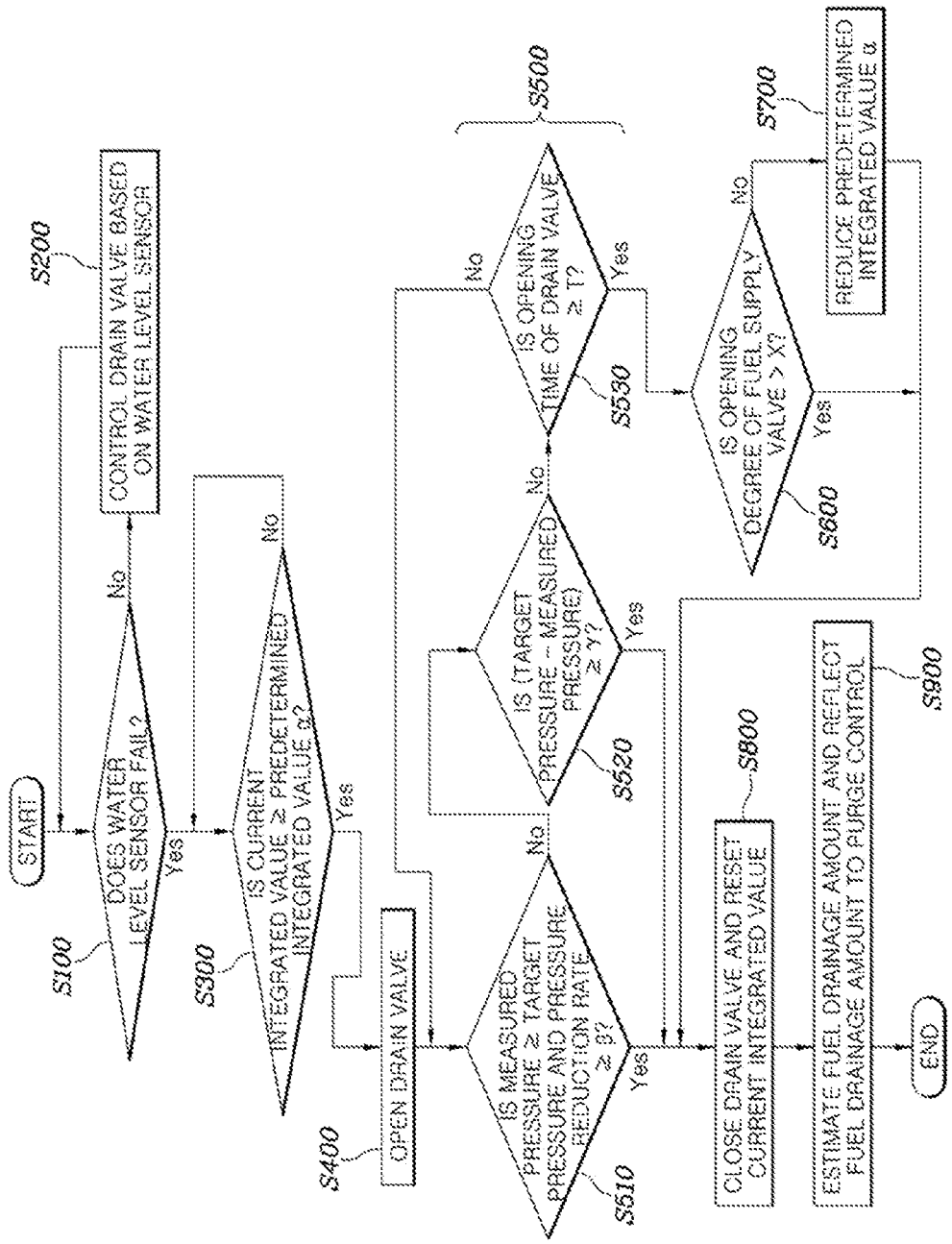
FIG. 2 is a flowchart of a condensate water drain control method for a fuel cell according to one embodiment of the present disclosure.

FIG. 2 is a flowchart of a condensate water drain control method for a fuel cell according to one embodiment of the present disclosure.

Referring to FIG. 2, the condensate water drain control method for a fuel cell according to one embodiment of the present disclosure includes estimating a reaction amount in a fuel cell stack (S300), controlling a drain valve to be opened, wherein the drain valve allows or blocks drainage of condensate water stored in a water trap, which stores the condensate water of a fuel supply line, according to opening or closing on the basis of the estimated reaction amount (S400), and controlling the drain valve to be closed on the basis of a state of a fuel supply to the fuel cell stack through the fuel supply line in an open state of the drain valve (S800).

In the estimating of the reaction amount in the fuel cell stack (S300), a reaction amount of hydrogen and oxygen supplied to the fuel cell stack is estimated. Although it may be different according to a reaction environment of the fuel cell stack, the condensate water generated in the fuel cell stack and transferred to the water trap is proportional to a reaction amount in the fuel cell stack. Therefore, the reaction amount in the fuel cell stack may be estimated and the drainage of the condensate water may be controlled on the basis of the estimated reaction amount.

In the controlling of the drain valve to be opened (S400), when the condensate water is determined as being stored in the water trap with a predetermined amount or more on the basis of the estimated reaction amount, the drain valve may be opened to allow the drainage of the condensate water through an outlet of the water trap.

In the controlling of the drain valve to be closed (S800), when the drainage of the condensate water is completed through the outlet of the water trap in a state in which the drain valve is opened, fuel of the fuel supply line may be drained to the outside. Therefore, it is possible to control the drain valve to be closed by detecting the drainage of the fuel of the fuel supply line on the basis of the state of the fuel supply to the fuel cell stack through the fuel supply line in the opened state of the drain valve.

Consequently, there is an effect of capable of effectively draining the condensate water stored in the water trap while minimizing the drainage of the fuel of the fuel supply line.

Before the estimating of the reaction amount in the fuel cell stack (S300), determining whether a water level sensor fails (S100) may be further included. More specifically, in the determining whether the water level sensor fails (S100), when a sensed value of the water level sensor is out of a normal sensing range, the water level sensor may be determined as failing.

As another embodiment, when the sensed value of the water level sensor is fixed even though the drain valve is controlled to be opened, the water level sensor may be determined as failing. That is, when a water level sensed by the water level sensor is not decreased for a reference time or more even though the drain valve is opened, the water level sensor may be determined as failing.

As still another embodiment, when the sensed value of the water level sensor is not increased even though the fuel cell stack continues to generate electric power in a closed state of the drain valve, the water level sensor may be determined as failing. Specifically, when the sensed value of the water level sensor is not increased even though a current integrated value obtained by integrating an output current of the fuel cell stack is increased to exceed a predetermined current integrated value, the water level sensor may be determined as not being operated normally.

In the determining whether the water level sensor fails (S100), when the water level sensor is determined as not failing, the drain valve may be controlled on the basis of the sensed value of the water level sensor (S200). The condensate water drain control method for a fuel cell according to the embodiment of the present disclosure may be limited to a case in which the water level sensor fails.

In the estimating of the reaction amount in the fuel cell stack (S300), the reaction amount in the fuel cell stack may be estimated on the basis of the current integrated value obtained by integrating the output current of the fuel cell stack with a passage of time.

The fuel cell stack generates a current by a chemical reaction between hydrogen and oxygen and supplies the current to loads including a motor and the like through a main bus. Therefore, the current integrated value obtained by integrating the output current from the fuel cell stack with the passage of time is proportional to the reaction amount in the fuel cell stack. Consequently, the reaction amount in the fuel cell stack may be estimated using the current integrated value.

In the controlling of the drain valve to be opened (S400), when the estimated reaction amount is equal to or greater than a predetermined reaction amount, the drain valve may be controlled to be opened. That is, when the estimated reaction amount in the fuel cell stack is equal to or greater than the predetermined reaction amount, the condensate water stored in the water trap is determined as needing to be drained such that the drain valve may be controlled to be opened.

The predetermined reaction amount may be set through experiment or may be set in consideration of an average value of a rate at which the condensate water is stored in the water trap under various operating conditions of the fuel cell stack, or a worst case.

Specifically, in the estimating of the reaction amount in the fuel cell stack (S300), when the reaction amount in the fuel cell stack is estimated on the basis of the current integrated value and the current integrated value is equal to or greater than a predetermined integrated value a, the drain valve may be controlled to be opened.

In the controlling of the drain valve to be closed (S800), when the drainage of the stored condensate water by the opening of the drain valve is completed, the fuel of the fuel supply line is drained through the outlet of the water trap such that drainage completion of the condensate water may be detected by determining whether the fuel of the fuel supply line is drained (S500).

As one embodiment, in the controlling of the drain valve to be closed (S800), when a pressure at the anode side of the fuel cell stack, which is measured by the pressure sensor, is decreased to a predetermined reduction rate $\beta$ or more (S510), the drain valve may be controlled to be closed. That is, when a sensed value of the pressure sensor for measuring the pressure at the anode side of the fuel cell stack is abruptly decreased to the predetermined reduction rate $\beta$ or more, the fuel of the fuel supply line is determined as being drained through the outlet of the water trap such that there is an effect of being capable of estimating drainage of the fuel through the outlet of the water trap.

Specifically, the measured pressure at the anode side of the fuel cell stack may be equal to or greater than a target pressure according to a required power generation amount of the fuel cell (S510). The target pressure is a target value on which the pressure at the anode side of the fuel cell stack converges and may be set to be proportional to the required power generation amount of the fuel cell.

That is, when the measured pressure at the anode side of the fuel cell stack is equal to or greater than the target pressure according to the required power generation amount of the fuel cell, the pressure at the anode side of the fuel cell stack is controlled to not be increased such that a fuel inflow through the fuel supply valve is minimized. Therefore, a variation of the pressure at the anode side of the fuel cell stack due to the fuel inflow through the fuel supply valve is minimized such that there is an effect of being capable of estimating more accurately whether the fuel is drained through the outlet of the water trap.

Specifically, when the pressure at the anode side of the fuel cell stack is less than the target pressure, it may be a case in which the required power generation amount of the fuel cell is decreased. When the measured pressure at the anode side of the fuel cell stack is equal to or less than the target pressure, the fuel supply valve may be controlled to have a small opening degree or to be closed. Accordingly, it is a section in which the pressure at the anode side of the fuel cell stack is gradually decreased to reach the target pressure as the fuel cell stack generates electric power and the fuel of the fuel supply line is consumed.

The predetermined reduction rate $\beta$ may be set to be larger than a reduction rate which gradually decreases to control the pressure at the anode side of the fuel cell stack to reach the target pressure as the fuel of the fuel supply line is consumed.

That is, when the pressure at the anode side of the fuel cell stack, which is measured by the pressure sensor, is decreased with the predetermined reduction rate $\beta$ or more, the fuel of the fuel supply line is determined as being drained through the outlet of the water trap such that the drain valve may be controlled to be closed.

As another embodiment, in the controlling of the drain valve to be closed (S800), when a value obtained by subtracting the pressure at the anode side of the fuel cell stack, which is measured by the pressure sensor, from the target pressure according to the required power generation amount of the fuel cell is equal to or greater than a predetermined pressure difference (S520), the drain valve may be controlled to be closed. The predetermined pressure difference may be set to be larger than a general pressure difference which is temporarily different from the pressure at the anode side of the fuel cell stack due to a variation of the target pressure according to the required power generation amount.

That is, when the pressure at the anode side of the fuel cell stack, which is measured by the pressure sensor, is decreased with a large difference relative to the target pressure (S520), the fuel of the fuel supply line is determined as being drained such that the drain valve may be controlled to be closed.

As still another embodiment, in the controlling of the drain valve to be closed (S800), when a predetermined opening time T is elapsed from a point of time at which the drain valve is controlled to be opened (S530), the drain valve may be controlled to be closed, whereas when the opening degree of the fuel supply valve in the fuel tank is equal to or less than a predetermined threshold opening degree X with the elapse of the predetermined opening time T (S600), a criterion of the reaction amount controlling the drain valve to be opened may be reduced (S700).

That is, when the predetermined opening time T is elapsed after the point of time at which the drain valve is controlled to be opened (S520), the drain valve may be controlled to be closed.

Further, in the controlling of the drain valve to be closed (S800), even though when the pressure at the anode side of the fuel cell stack, which is measured by the pressure sensor, is decreased to the predetermined reduction rate $\beta$ or more (S510), the drain valve is controlled to be closed, or when the value obtained by subtracting the pressure at the anode side of the fuel cell stack, which is measured by the pressure sensor, from the target pressure according to the required power generation amount of the fuel cell is equal to or greater than the predetermined pressure difference (S520), the drain valve is controlled to be closed, when the drain valve is not closed even with the elapse of the predetermined opening time T after the drain valve is controlled to be opened, the drain valve may be controlled to be closed.

That is, even when the fuel of the fuel supply line is determined as not being drained, the drain valve may be controlled to be closed when the predetermined opening time T is elapsed. Therefore, it is possible to prevent the drainage of the fuel of the fuel supply line through the outlet of the water trap.

Further, it is possible to determine whether the opening degree of the fuel supply valve in the fuel tank is equal to or less than the predetermined threshold opening degree X with the elapse of the predetermined opening time T. When the opening degree of the fuel supply valve exceeds the predetermined threshold opening degree X in a state in which the drain valve is opened for the predetermined opening time T, the fuel of the fuel supply line is determined as being drained through the outlet of the water trap.

The predetermined threshold opening degree X may be set in consideration of a normal opening degree range for directing the pressure at the anode side of the fuel cell stack to converge on the target pressure according to the required power generation amount of the fuel cell.

However, when the opening degree of the fuel supply valve is equal to or less than the predetermined threshold opening degree X, the criterion of the reaction amount controlling the drain valve to be opened may be reduced (S700). That is, the above-described predetermined integrated value a may be decreased (S700).

When the opening degree of the fuel supply valve is equal to or less than the predetermined threshold opening degree X, it may be a state in which the condensate water stored in the water trap is not completely drained, or the condensate water remains inside the fuel supply line or the fuel cell stack. Accordingly, it is possible to reduce the predetermined reaction amount which is the criterion for controlling the drain valve to be opened (S700).

Specifically, it is possible to fix the target pressure according to the required power generation amount of the fuel cell from the point of time at which the drain valve is controlled to be opened to the elapse of the predetermined opening time T. Accordingly, it is possible to accurately detect a variation of the pressure of the fuel supply line, which converges on the target pressure.

That is, there is an effect of being capable of detecting more accurately a situation in which the fuel of the fuel supply line is drained through the outlet of the water trap and thus the pressure of the fuel supply line is lowered.

In the controlling of the drain valve to be closed (S800), the current integrated value may be reset. That is, the current integrated value obtained by integrating a current with the passage of time, which is used as the criterion for the controlling of the drain valve to be opened (S400), may be reset to 0 while the drain valve is controlled to be closed, and then an output current of the fuel cell stack may be integrated again with the passage of time so as to control the drain valve to be opened.

After the controlling of the drain valve to be closed (S800), estimating a fuel drainage amount drained through the outlet of the water trap (S900), and controlling opening of a purge valve for controlling purge for draining a gas of the fuel supply line to the outside on the basis of the estimated fuel drainage amount (S900) may be further included.

Owing to crossover, impurities are accumulated at the gas of the fuel supply line drained from the fuel cell stack and thus the purge valve may be opened to drain the gas of the fuel supply line to the outside. Specifically, in the controlling of the opening of the purge valve (S900), an opening period and an opening time of the purge valve may be controlled.

However, when the gas of the fuel supply line is drained to the outside through the outlet of the water trap by the opening of the drain valve, the fuel drainage amount through the outlet of the water trap may be estimated and reflected to the purge valve control. Specifically, it is possible to control the opening period of the purge valve to be increased or the opening time of the purge valve to be decreased so as to reduce a purge amount through the opening of the purge valve by the estimated fuel drainage amount.

Specifically, in the estimating of the fuel drainage amount (S900), the fuel drainage amount may be estimated on the basis of a pressure difference between the pressure at the anode side of the fuel cell stack and an external pressure.

The purge valve is disposed between the fuel supply line and the outside connected to the fuel supply line, and the outside may an inlet of the cathode side. Accordingly, the external pressure may be a pressure at the inlet of the cathode side of the fuel cell stack.

The fuel drainage amount may be proportional to a difference between the pressure at the anode side of the fuel cell stack and the external pressure, or a difference between the pressure at the anode side of the fuel cell stack and a pressure at the inlet of the cathode side of the fuel cell stack.

Specifically, a hydrogen drainage rate g/s according to the pressure at the anode side of the fuel cell stack and the inlet of the cathode side thereof may be determined by a pre-stored table or map.

Therefore, a hydrogen drainage amount g may be estimated using the determined hydrogen drainage rate g/s and a closing time s between a point of time at which the drain valve is controlled to be closed and a point of time at which the drain valve is actually closed. The closing time s may be experimentally determined according to specifications of a system.

Therefore, purge control is performed by reflecting the fuel drainage amount of the fuel supply line, which is drained through the outlet of the water trap, such that there is an effect of improving fuel efficiency by preventing unnecessary fuel drainage and robustness of control.

According to the condensate water drain control system and the condensate water drain control method for a fuel cell of the present disclosure, even when a water level sensor fails or the water level sensor is not included, there is an effect of being capable of appropriately draining condensate water stored in a water trap by controlling a drain valve.

Further, there is an effect of being capable of preventing occurrence of flooding at a fuel cell stack due to an excessive condensate water stored in the water trap and drainage of hydrogen from the fuel supply line through the drain valve.

Although specific embodiments of the present disclosure has been described and illustrated, those skilled in the art will appreciate that various alternations and modifications are possible without departing from the technical spirit of the present disclosure as disclosed in the appended claims.

What is claimed is:

1. A condensate water drain control method for a fuel cell, comprising:
   estimating a reaction amount of fuel in a fuel cell stack;
   controlling a drain valve to be opened, wherein the drain valve allows or blocks drainage of condensate water stored in a water trap for storing the condensate water of a fuel supply line on the basis of the estimated reaction amount;
   controlling the drain valve to be closed on the basis of a state of supplying fuel to the fuel cell stack through the fuel supply line in a state in which the drain valve is opened;
   estimating a fuel drainage amount drained through an outlet of the water trap after the controlling of the drain valve to be closed; and
   controlling a purge valve to be opened, wherein the purge valve controls purge for draining a gas of the fuel supply line to an outside on the basis of the estimated fuel drainage amount,
   wherein in the estimating of the fuel drainage amount, the fuel drainage amount is estimated based on a pressure difference between a pressure at an anode side of the fuel cell stack and an external pressure,
   in the state in which the drain valve is opened, it is determined whether an opening degree of a fuel supply valve in a fuel tank is equal to or less than a predetermined threshold opening degree when a predetermined opening time of the drain valve is elapsed from a point of time at which the drain valve is controlled to be opened, and
   in response to determining that the opening degree of the fuel supply valve is equal to or less than the predetermined threshold opening degree, a criterion of the reaction amount for controlling the drain valve to be opened is reduced.

2. The condensate water drain control method of claim 1, wherein the estimating of the reaction amount of the fuel in the fuel cell stack includes estimating the reaction amount of the fuel in the fuel cell stack on the basis of a current integrated value obtained by integrating an output current of the fuel cell stack with a passage of time.

3. The condensate water drain control method of claim 1, wherein, in the controlling of the drain valve to be opened, the drain valve is opened, where the estimated reaction amount is equal to or greater than a predetermined reaction amount.

4. The condensate water drain control method of claim 1, wherein the measured pressure of the anode side of the fuel cell stack is equal to or greater than a target pressure set according to a required power generation amount of the fuel cell.

5. The condensate water drain control method of claim 1, wherein, in the controlling of the drain valve to be closed, the drain valve is closed, where a value obtained by subtracting a pressure of an anode side of the fuel cell stack, which is measured by a pressure sensor, from a target pressure set according to a required power generation amount of the fuel cell is equal to or greater than a predetermined pressure difference.

6. The condensate water drain control method of claim 1, wherein:
    in the controlling of the drain valve to be closed, the drain valve is closed, where a predetermined opening time is elapsed from a point of time at which the drain valve is controlled to be opened; and
    a criterion of the reaction amount for controlling the drain valve to be opened is reduced, where the predetermined opening time is elapsed and an opening degree of the fuel supply valve in a fuel tank is equal to or less than a predetermined threshold opening degree.

7. The condensate water drain control method of claim 6, wherein a target pressure set according to a required power generation amount of the fuel cell is fixed for the predetermined opening time elapsed from the point of time at which the drain valve is controlled to be opened.

8. The condensate water drain control method of claim 1, wherein, in the controlling of the drain valve to be closed, the drain valve is closed, where a pressure at an anode side of the fuel cell stack, which is measured by a pressure sensor, is decreased at a predetermined reduction rate or more.

\* \* \* \* \*